United States Patent [19]

Henneman et al.

[11] 4,275,870
[45] Jun. 30, 1981

[54] APPARATUS FOR CONTROLLING SPEED AND DIRECTION OF A VEHICULAR TOWING WINCH

[75] Inventors: Richard C. Henneman; Kenneth A. Burdon, both of Bellevue; Joseph R. Bruce, Seattle, all of Wash.

[73] Assignee: PACCAR Inc., Bellevue, Wash.

[21] Appl. No.: 78,580

[22] Filed: Sep. 24, 1979

Related U.S. Application Data

[62] Division of Ser. No. 733,150, Oct. 18, 1976, Pat. No. 4,185,520.

[51] Int. Cl.³ .......................... B66D 1/08; B66D 1/44
[52] U.S. Cl. .................................................. 254/361
[58] Field of Search .................. 74/867, 868, 874; 192/0.098, 0.096; 60/435, 436; 254/291, 297, 303, 315, 310, 323, 344, 321, 349, 361, 356, 367

[56] References Cited

U.S. PATENT DOCUMENTS

| | | | |
|---|---|---|---|
| 3,269,206 | 4/1966 | Carr | 74/874 |
| 3,296,893 | 1/1967 | Shaffer et al. | 254/187.5 X |
| 3,592,346 | 7/1971 | Brown | 254/186 R |
| 3,939,950 | 2/1976 | Nishida et al. | 254/185 B |
| 4,042,215 | 8/1977 | Hakes | 254/187.4 |

Primary Examiner—John M. Jillions
Attorney, Agent, or Firm—Seed, Berry, Vernon & Baynham

[57] ABSTRACT

A unique, single lever hand control is operatively associated with means for energizing the clutch mechanism which control the various parts of the transmission as well as control the reversibility and stroke of a pump which drives the input motor. The hand control assures a proper correlation between braking and powering of the drum.

4 Claims, 3 Drawing Figures

| OPERATION | ENERGIZE |
|---|---|
| FREE WHEEL | a & b |
| BRAKE ON | — |
| LOW SPEED | a |
| HIGH SPEED | b |

APPARATUS FOR CONTROLLING SPEED AND DIRECTION OF A VEHICULAR TOWING WINCH

This is a division, of application Ser. No. 733,150, filed Oct. 18, 1976, now U.S. Pat. No. 4,185,520.

BACKGROUND OF THE INVENTION

1. Field of the Invention

This invention pertains to apparatus for controlling speed and direction of towing winches on vehicles and to improvements in the controls and the construction of such winches.

SUMMARY OF THE INVENTION

It is an object of this invention to simplify the controls for a towing winch.

Basically, this object is obtained by providing a reversible input motor and a transmission, a part of which can be locked for providing one speed, an independent part of which can be locked for providing a second speed, all parts of which can be locked for completely braking the winch and all parts of which can be released for allowing the winch drum to freewheel. Control of the selective locking and releasing of the parts of the transmission are preferably obtained through fluid controls actuated from a single hand lever. The winch is easy to operate, provides optimum flexibility for different uses and eliminates more conventional band type brakes with their inherent problems of heat generation and maintenance.

The important feature of this invention is the provision of a single hand lever control for use with various types of winches in which a separate set of dependent members follows movement of the hand lever to release the winch drum brake only when it is safe and desirable to do so.

BRIEF DESCRIPTION OF THE FIGURES OF THE DRAWING

FIG. 1A is a fragmentary schematic illustrating a portion of a hand lever control used with the winch shown in FIG. 1.

DETAILED DESCRIPTION OF THE PREFERRED EMBODIMENTS

Figure 1:
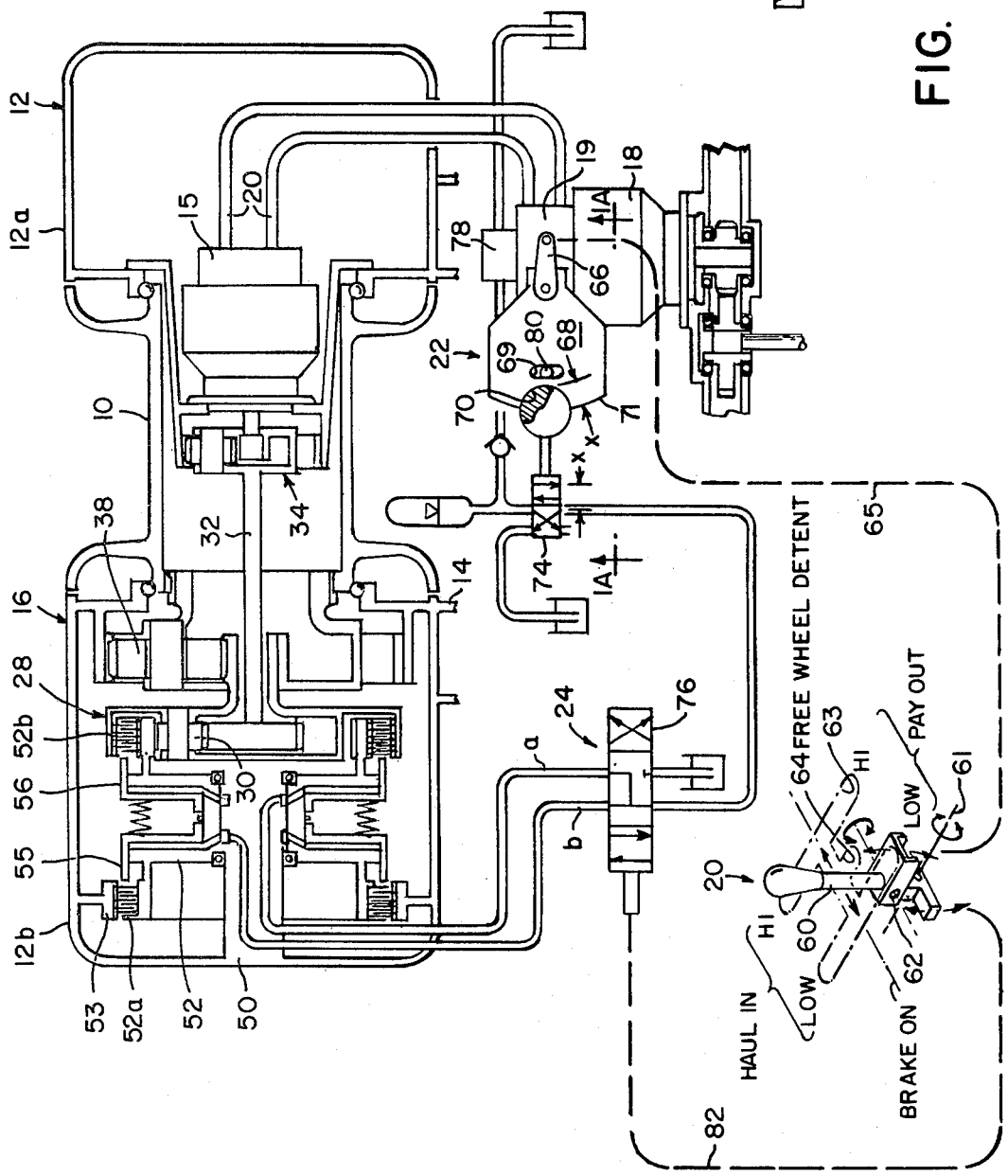
FIG. 1 is an axial schematic section taken through a transmission and winch drum and showing various controls used to operate the winch according to the principles of the invention.
Figure 2:
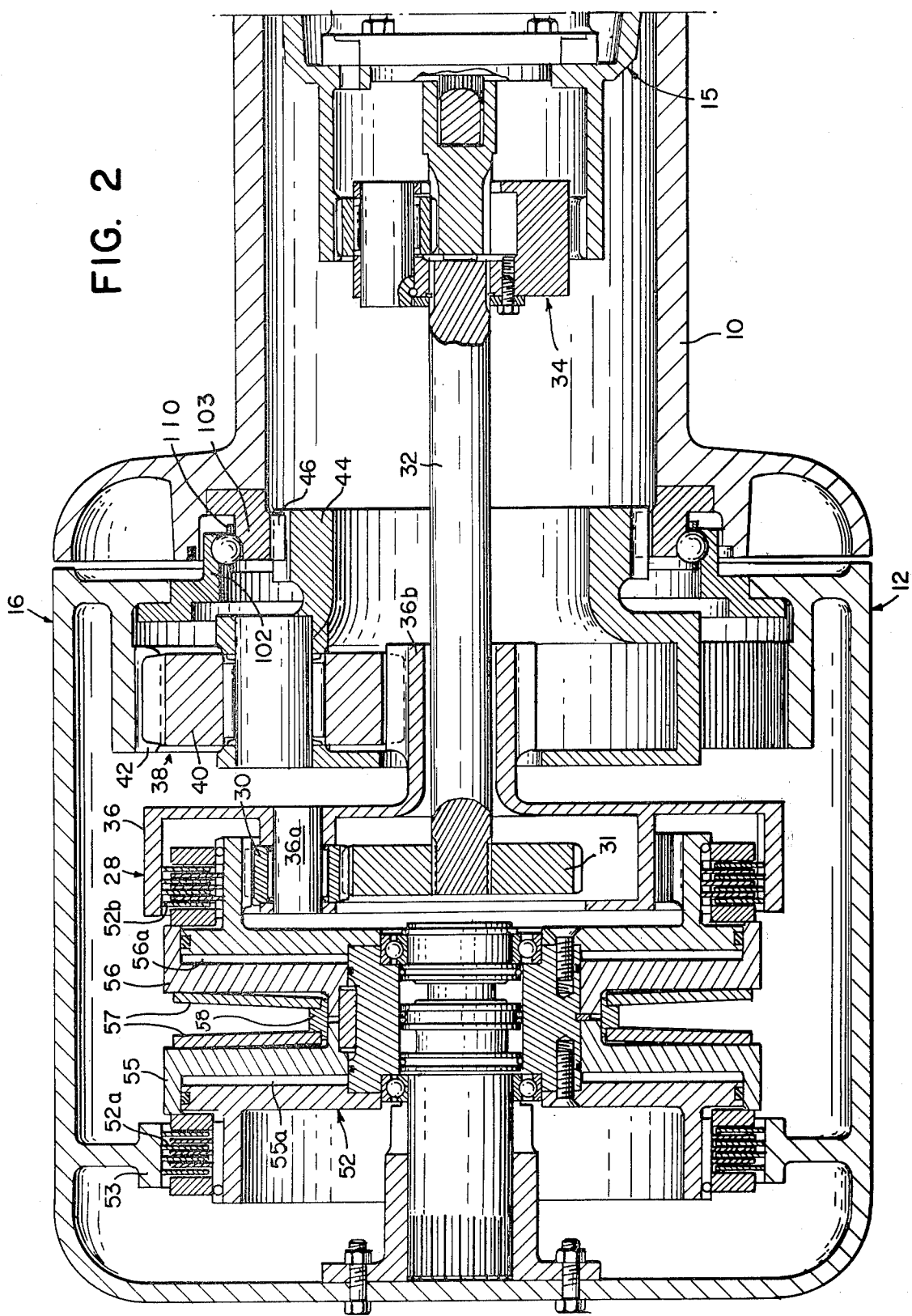
FIG. 2 is an enlarged axial section of the transmission.

The towing winch of this invention includes a cable drum 10 rotatably mounted on a winch case 12 which is fixed to the frame 14 that is connected to the vehicle T (FIG. 4). The winch is also provided with a reversible, fixed displacement, hydraulic motor 15 and a transmission 16. A variable displacement hydraulic pump 18 whose displacement is controlled by a servo mechanism 19 provides hydraulic power fluid through lines 20 to the motor 15. Control of the variable displacement over center pumping such as by adjusting the position of a swash plate and thus the direction and output of the pump and control of the hydraulically actuated elements of the transmission are obtained through a single lever hand control 20. This hand control operates a mechanical-hydraulic control 22 which controls braking, speed and direction of the winch and controls independently a hydraulic valve 24 which controls speed, braking and freewheeling of the cable drum via two control fluid input lines a and b.

The winch transmission 16 includes a first planetary set 28 comprising a first planet gear 30, a first sun gear 31 which meshes with the planet gear and which is secured to an input member 32. The input member is secured to a conventional planetary set 34 that is driven by the motor 15. The first planetary set 28 further comprises a first ring gear 36 which is formed integrally with a first planet carrier 36a and a second sun gear 36b.

The transmission 16 is further provided with a second planetary set 38 comprising second planetary gears 40, the second sun gear 36b, a second ring gear 42 that is fixed to the case 12 and a second planet carrier or output member 44 that meshes with a spline 46 on the cable drum 10.

The transmission case 12 is provided with a hub 50 that rotatably mounts a clutch ring 52. The clutch ring supports a first set of friction discs 52a and a second set of friction discs 52b. A ring gear 53 is meshed with the friction discs 52a and is fixed to the transmission case 12. The friction discs are of a conventional design such that they are meshed with the teeth of the ring gears 53 and 36 and mesh with the clutch ring 52. When the discs are compressed they ultimately stop relative movement between the various ring gears and clutch ring and when released allow relative rotational movement. A set of clutch actuators 55 and 56 are spring biased by common springs 57 to hold the friction discs in their locking positions. A snap ring 58 limits retraction of the actuators. Each of the actuators forms a respective cavity or chamber 55a and 56a which, with suitable seals, forms a cylinder making the respective actuator a piston which will slide axially along the clutch ring 52. Hydraulic or pneumatic pressure to release one of the sets of friction discs by shifting the actuators is provided through the control fluid lines a or b which may be energized independently or simultaneously. As best shown in the operational chart in FIG. 1, simultaneous energization of lines a and b will release both of the sets of friction elements allowing the cable drum to freewheel. Deenergizing simultaneously both of the inlet lines a and b will cause the springs 57 to lock each of the friction discs so that the cable drum will be locked or in a braked condition. High speed operation of the winch drum will occur by energizing only inlet line b. When inlet b is energized friction discs 52a are released allowing the clutch ring to rotate on the hub 50. Since friction elements 52b, however, remain locked to ring gear 36, sun gear 36b will rotate at the same speed as input shaft 32 so that no decrease in speed is obtained. Low speed operation is obtained by energizing only input line a. When input line a is energized, friction discs 52b are released but the clutch ring is locked to the case through friction elements 52a. Now when input member 32 rotates, planet gears 30 are free to rotate thus producing an increased gear ratio driving the output member 44 at a reduced speed.

The mechanical-hydraulic hand lever control 20 and 22 are best explained from FIGS. 1 and 1A. A hand lever 60 is pivotally mounted to rotate transversely about an axis 61 and fore-and-aft about a perpendicular axis 62. Slots 63 are provided in a framework to guide the movement of the hand lever into the haul-in and pay-out positions in the respective low and high speeds.

A free-wheel slot position 64 is provided centrally from the brake-on position. The movement about axis 62 is translated through a control cable 65 to a control lever 66. As best shown in FIG. 1A the control lever 66 is mounted for pivotal movement and is integrally connected to a flat cam plate 68. The cam plate has a slot 69 as shown in FIG. 1. The cam plate also has a primary cam surface 71 and a concave detent or cam surface 70. As shown in FIG. 1, the detent 70 is resting against a cam follower 72. The cam follower is connected to the spool of a brake valve 74. Movement of the spool to the right positions the valve as shown in the drawing blocking control fluid to a main control valve 76. Movement of the spool to the left as by rotating the cam plate 68 until the surface 71 engages the cam follower allows control fluid to reach the main valve 76. Control fluid pressure is obtained in the preferred embodiment by a supplementary small charge pump 78 which operates at approximately 150 to 200 psi although a reduction valve as shown in the modified version can be used off the main pump 18 even though the main pump operates between 0 and 6,000 psi.

As best shown in FIG. 1A, a lower plate 79 is freely pivotally connected to the upper plate 68 but is splined to the servo control 19 of the main pump 18. Movement between the cam plate 68 and 79 is provided solely between the slot 69 and a detent pin 80 on the lower plate 79. With this arrangement it can be seen that when the hand lever 60 is pulled back into the free wheel detent position (slot 64) control cable 65 will pivot the plate 68 moving the spool of the brake valve to the left thus allowing charge pressure to reach the main control valve 24. (In the alternative, return of the cam 68 to a centered, brake-on position, cannot occur until the servo mechanism 19 has returned the pump to neutral position.) The spool of the main control valve is controlled by a cable 82. When the hand lever 60 is in the center position, the spool of the main control valve 24 is centered as shown in FIG. 1. While the cam follower 72 of the brake valve was in the detent position 70, the brake on the winch drum remained set because no control fluid could move either the actuator 56 or 55. This occurred even though the spool of the main control valve 76 was centered enabling energization of the actuator 55 and 56 if control fluid pressure were available. By having shifted out of the detent position and thus shifted the spool of the brake valve 74 to the left the control fluid pressure does reach the actuators 55 and 56 extending them and placing the winch into the freewheel position.

In all shifting positions the hand lever must pass through the center or brake-on position and the cam follower 72 will always come back to rest in the detent 70 of the upper cam plate 68 so that the brake will always be set on the winch drum when shifting. Whenever the hand lever is moved out of the brake-on position, however, it can be seen that the cam follower 72 moves onto the cam surface 71 thus shifting the spool of the brake valve to the left and enabling control fluid pressure to reach the main control valve. In each of the low and high speed positions on the brake-on position, however, it can be seen that moving off the brake-on position will first again unlock the brake by enabling pressure to reach the valve 24 and since the spool 76 of the main control valve has been shifted to the left or to the right of the position shown in FIG. 1, one of the actuators will immediately be extended. Thus at this time the winch drum is free to turn but cannot turn until gradual and further movement of the hand lever 60 into one of the speed positions will cause the pump to begin sending high pressure power fluid to the motor 15. The speed of the motor in each of the speed ranges will thus in the preferred embodiment be dependent upon the extent of movement of the hand lever as it directly controls the servo mechanism 19 or swash plate control of the main pump 18. Alternatively, of course, two speed ranges without further variation can be obtained if a fixed displacement pump was substituted for pump 18.

Figure 3:
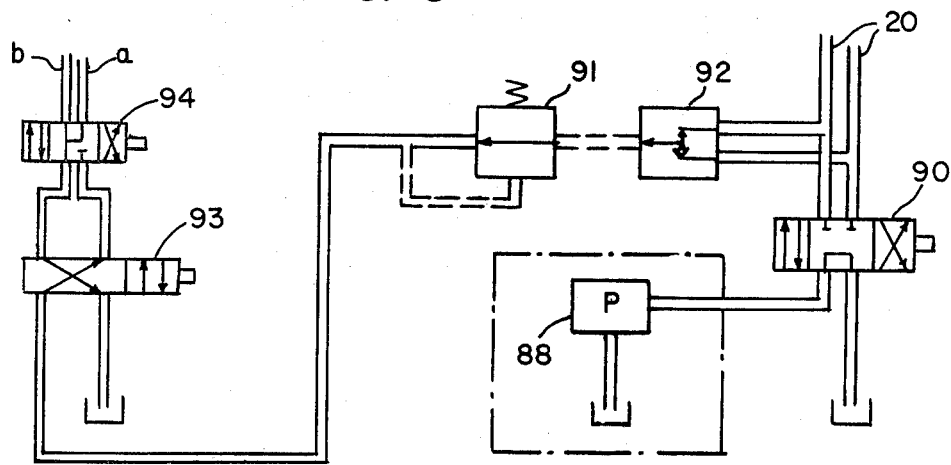
FIG. 3 is a second operational schematic of a second embodiment of the invention used with the transmission and winch drive of FIG. 1.

Another embodiment of the invention is best shown in FIG. 3. In this embodiment a fixed displacement, non-reversible pump 88 is coupled to power lines 20 through a manual four-way, three-position, control valve 90. Control fluid pressure is obtained by a pressure reducing valve 91 and a shuttle valve 92. A manual braking or blocking valve 93 functions as previous valve 74 and a manual four-way, three-position control valve 94 functions to selectively energize control fluid lines a and b as previously described. As is apparent this embodiment is a less expensive, more basic alternative. Other alternatives include operating either from a tractor power takeoff as shown, or using the tractor's own internal hydraulic pump as a substitute for pump 18 or 88. These various options of course all are usable with the winch transmission and allow replacement of the conventional gearing between the conventional gear driven winches and the power takeoff of the tractor with a resultant savings of about two-thirds of the space normally required for the gearing. The preferred embodiment, however, is with a pump coupled as part of the winch thus enabling the tractor owner to attach a complete, integral winch and power package to almost any type of tractor.

The embodiments of the invention in which a particular property or privilege is claimed are defined as follows:

1. A mechanical-fluid control mechanism for operating a hydraulically powered and operated winch in which the winch is powered by an hydraulic motor driven by an hydraulic pump and includes input and output power fluid lines to said motor, and the winch further has a fluid control circuit with two control fluid lines which when selectively energized will cause the winch to provide a variety of operating functions, the improvement comprising:

a manually positionable lever movable into low speed haul-in, low speed pay-out, high speed haul-in, high speed pay-out, brake-on and freewheel positions;

first valve means having a first valve core movable for energizing said two control fluid lines of said hydraulic operating circuit, first link means coupling said first valve core with said lever;

brake valve means in series with said first valve means in said hydraulic operating circuit and having a second valve core movable between a brake-on position blocking control fluid to said first valve core and a brake-off position directing control fluid to said first valve core, second link means coupled to said lever, and cam means operatively coupled to said second link means and to said second valve core for actuating said second valve core in response to movements of said second link;

winch power control means operatively controlling the power fluid within said motor input and outlet lines; and lost-motion linkage means coupled between said cam means and said winch power control means for actuating said winch power control means only after said cam means moves said second valve core to allow control fluid to pass to said first valve core, whereby the brake is unlocked prior to delivering power fluid to initiate one of said winch operating functions and is prevented from locking until the winch power control means returns the power fluid to a neutral non-flowing condition.

2. The control mechanism of claim 1, said pump being an hydraulic variable displacement, reversible delivery pump, having a servo control member for controlling volume and direction of the power fluid and thus the motor, said control circuit being hydraulic, said functions of said hydraulic circuit including high speed, low speed, freewheel and brake-on, said winch power control means including said servo control member for controlling the direction and flow rate of the power fluid whereby movement of said lost-motion linkage means will vary the speed and direction of the motor.

3. The control mechanism of claim 1, said cam means including a flat first plate having a first cam surface for opening said brake valve and a second cam surface for closing said brake valve to block fluid to said first valve core, said flat plate being pivotally mounted and coupled to said second link means for movement thereby, said flat plate containing an arcuate slot, said lost-motion linkage means including a second, pivotally mounted plate having a detent fitted within said arcuate slot and a lower end fixed to said winch power control means whereby movement of the flat first plate will first actuate the brake release and then cause movement of the second plate and thus movement of the winch power control means to vary the speed and direction of the motor.

4. The control mechanism of claim 2, said cam means including a flat first plate having a first cam surface for opening said brake valve and a second cam surface for closing said brake valve to block fluid to said first valve core, said flat first plate being pivotally mounted and coupled to said second link means for movement thereby, said flat plate containing an arcutate slot, said lost-motion linkage means including a pivotally mounted second plate having a detent fitted within said arcuate slot and a lower end fixed to said servo control member whereby movement of the flat first plate will first actuate the brake release and then cause movement of the second plate and thus movement of the winch power control means to vary the speed and direction of the motor.

* * * * *